(12) United States Patent
Allan et al.

(10) Patent No.: US 10,488,861 B2
(45) Date of Patent: *Nov. 26, 2019

(54) SYSTEMS AND METHODS FOR ENTERING TRAFFIC FLOW IN AUTONOMOUS VEHICLES

(71) Applicant: GM GLOBAL TECHNOLOGY OPERATIONS LLC, Detroit, MI (US)

(72) Inventors: Jeremy Allan, San Francisco, CA (US); Eric Lujan, San Francisco, CA (US); Peter Gao, San Francisco, CA (US); Siddhartho Bhattacharya, San Jose, CA (US); Wei Mou, South San Francisco, CA (US); Jonathan Uesato, Saratoga, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/820,578

(22) Filed: Nov. 22, 2017

(65) Prior Publication Data

US 2018/0095466 A1 Apr. 5, 2018

(51) Int. Cl.
*G05D 1/02* (2006.01)
*G05D 1/00* (2006.01)

(52) U.S. Cl.
CPC ......... *G05D 1/0088* (2013.01); *G05D 1/0257* (2013.01); *G05D 2201/0213* (2013.01)

(58) Field of Classification Search
CPC .. G05D 1/0088; G05D 1/0214; G05D 1/0246; G05D 1/0257; G05D 2201/0213; B60W 40/02; G06K 9/00805; G06K 9/00825
USPC .......................................................... 701/23
See application file for complete search history.

(56) References Cited

U.S. PATENT DOCUMENTS

| | | | |
|---|---|---|---|
| 9,940,834 B1* | 4/2018 | Konrardy | G08G 1/096725 |
| 2008/0162027 A1* | 7/2008 | Murphy | B60W 50/14 |
| | | | 701/117 |
| 2010/0256836 A1* | 10/2010 | Mudalige | G08G 1/163 |
| | | | 701/2 |
| 2018/0095465 A1* | 4/2018 | Gao | B62D 15/0265 |

* cited by examiner

*Primary Examiner* — Gertrude Arthur Jeanglaude
(74) *Attorney, Agent, or Firm* — Lorenz & Kopf, LLP

(57) ABSTRACT

Systems and method are provided for controlling a vehicle. In one embodiment, an obstacle management method includes receiving, via one or more sensing devices, sensor data relating to an environment associated with a vehicle, wherein the vehicle is substantially stationary and has an intended path corresponding to entering a traffic flow of a first lane. The method includes determining the presence of an obstacle that at least partially occludes a view of the first lane by a first sensing device of the one or more sensing devices, and positioning, with a processor, the vehicle with respect to the obstacle to improve the view of the first lane by the first sensing device without significantly obstructing the first lane. The first lane is then monitored via the first sensing device to determine when the intended path clear.

20 Claims, 6 Drawing Sheets

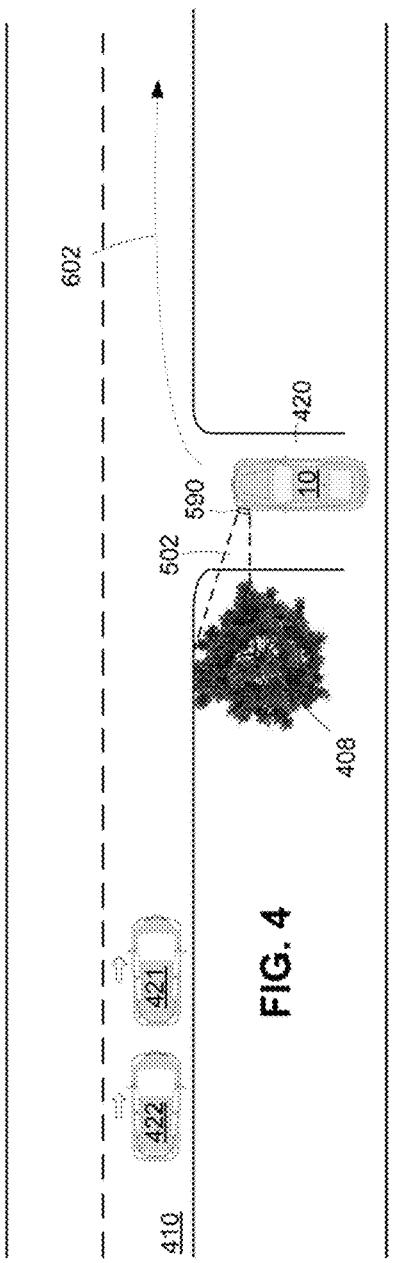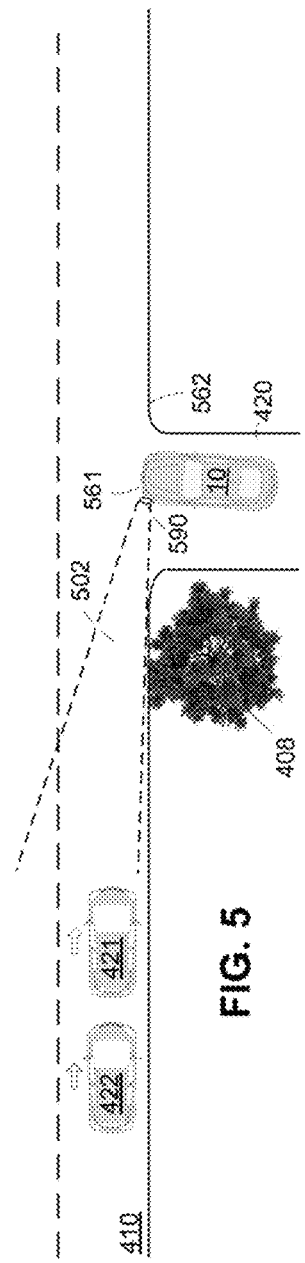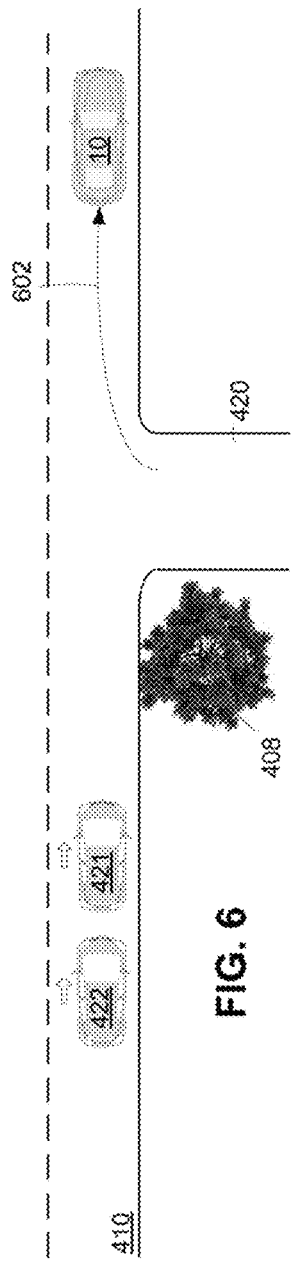

SYSTEMS AND METHODS FOR ENTERING TRAFFIC FLOW IN AUTONOMOUS VEHICLES

TECHNICAL FIELD

The present disclosure generally relates to autonomous vehicles, and more particularly relates to systems and methods for entering traffic flow in autonomous vehicles.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, it is not unusual for an autonomous vehicle to encounter obstacles that might occlude, to some extent, the field of view of various sensing devices that are attempting to monitor oncoming traffic. This is particularly the case in scenarios where the autonomous vehicle is stationary at an intersection with the intent of entering the flow of oncoming traffic, for example, while attempting to turn right into traffic from a minor road or alley.

Accordingly, it is desirable to provide obstacle management systems and methods that allow an autonomous vehicle to enter the flow of traffic when an obstacle is blocking the field of view of one or more sensing devices employed by the autonomous vehicle. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a first vehicle. In one embodiment, an obstacle management method includes receiving, via one or more sensing devices, sensor data relating to an environment associated with a vehicle, wherein the vehicle is substantially stationary and has an intended path corresponding to entering a traffic flow of a first lane. The method further includes determining, with the sensor data, the presence of an obstacle in the environment that at least partially occludes a view of the first lane by a first sensing device of the one or more sensing devices; and positioning, with a processor, the vehicle with respect to the obstacle to improve the view of the first lane by the first sensing device without significantly obstructing the first lane. The method then continues with monitoring the first lane via the first sensing device to determine when the intended path clear, and entering the traffic flow of the first lane when it is determined that the intended path is clear.

In one embodiment, the first sensing device is radar sensor.

In one embodiment, the positioning of the vehicle is performed iteratively until the view of the first lane by the first sensing device has improved by a predetermined amount.

In one embodiment, iteratively performing the positioning of the vehicle includes determining whether further repositioning the vehicle would significantly obstruct the first lane; and if it is determined that further repositioning would not significantly obstruct the first lane, moving the vehicle forward by a predetermined amount to improve the view of the first lane.

In one embodiment, positioning the vehicle includes altering at least one of a pose and a position of the vehicle such that a portion of the vehicle partially extends into the first lane.

In one embodiment, monitoring the first lane via the first sensing device includes tracking only a lead vehicle of a plurality of oncoming vehicles within the first lane.

In one embodiment, the method includes transmitting information regarding the obstacle to a server remote from the vehicle.

A system for controlling a vehicle in accordance with one embodiment includes an object detection module, a positioning module, and a clearing module. The object detection module includes a processor, configured to: receive, via one or more sensing devices, sensor data relating to an environment associated with a vehicle, wherein the vehicle is substantially stationary and has an intended path corresponding to entering a traffic flow of a first lane; determine, with the sensor data, the presence of an obstacle that at least partially occludes a view of the first lane by a first sensing device of the one or more sensing devices. The positioning module is configured to position, with a processor, the vehicle with respect to the obstacle to improve the view of the first lane by the first sensing device without significantly obstructing the first lane. The clearing module is configured to monitor the first lane via the first sensing device to determine when the intended path is clear, and entering the traffic flow of the first lane when it is determined that the intended path is clear.

In one embodiment, the first sensing device is radar sensor.

In one embodiment, the positioning module positions the vehicle iteratively until the view of the first lane by the first sensing device has improved by a predetermined amount. In one embodiment, iteratively performing the positioning of the vehicle includes determining whether further repositioning the vehicle would significantly obstruct the first lane; and if it is determined that further repositioning would not significantly obstruct the first lane, moving the vehicle forward by a predetermined amount to improve the view of the first lane.

In one embodiment, positioning the vehicle includes altering at least one of a pose and a position of the vehicle such that a portion of the vehicle partially extends into the first lane.

In one embodiment, the clearing module monitors the first lane via the first sensing device and tracks only a lead vehicle of a plurality of oncoming vehicles within the first lane.

In one embodiment, the clearing module further transmits information regarding the obstacle to a server remote from the vehicle.

An autonomous vehicle in accordance with one embodiment includes a plurality of sensing devices that provide sensor data, and a controller that includes a processor that, based on the sensor data: receives, via one or more sensing devices, sensor data relating to an environment associated with a vehicle, wherein the vehicle is substantially stationary and has an intended path corresponding to entering a traffic flow of a first lane; determines, with the sensor data, the presence of an obstacle that at least partially occludes a view of the first lane by a first sensing device of the one or more sensing devices. The controller further positions, with a processor, the vehicle with respect to the obstacle to improve the view of the first lane by the first sensing device without significantly obstructing the first lane; monitors the first lane via the first sensing device to determine when the intended path is clear; and enters the traffic flow of the first lane when it is determined that the intended path is clear.

In one embodiment, the first sensing device is radar sensor.

In one embodiment, the controller positions the vehicle iteratively until the view of the first lane by the first sensing device has improved by a predetermined amount.

In one embodiment, the controller alters at least one of a pose and a position of the vehicle such that a portion of the vehicle partially extends into the first lane.

In one embodiment, the clearing module monitors the first lane via the first sensing device includes tracking only a lead vehicle of a plurality of oncoming vehicles within the first lane.

In one embodiment, the clearing module further transmits information regarding the obstacle to a server remote from the vehicle.

DESCRIPTION OF THE DRAWINGS

The exemplary embodiments will hereinafter be described in conjunction with the following drawing figures, wherein like numerals denote like elements, and wherein:

FIGS. 4-6 are successive, top-down views of an exemplary autonomous vehicle entering traffic flow, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
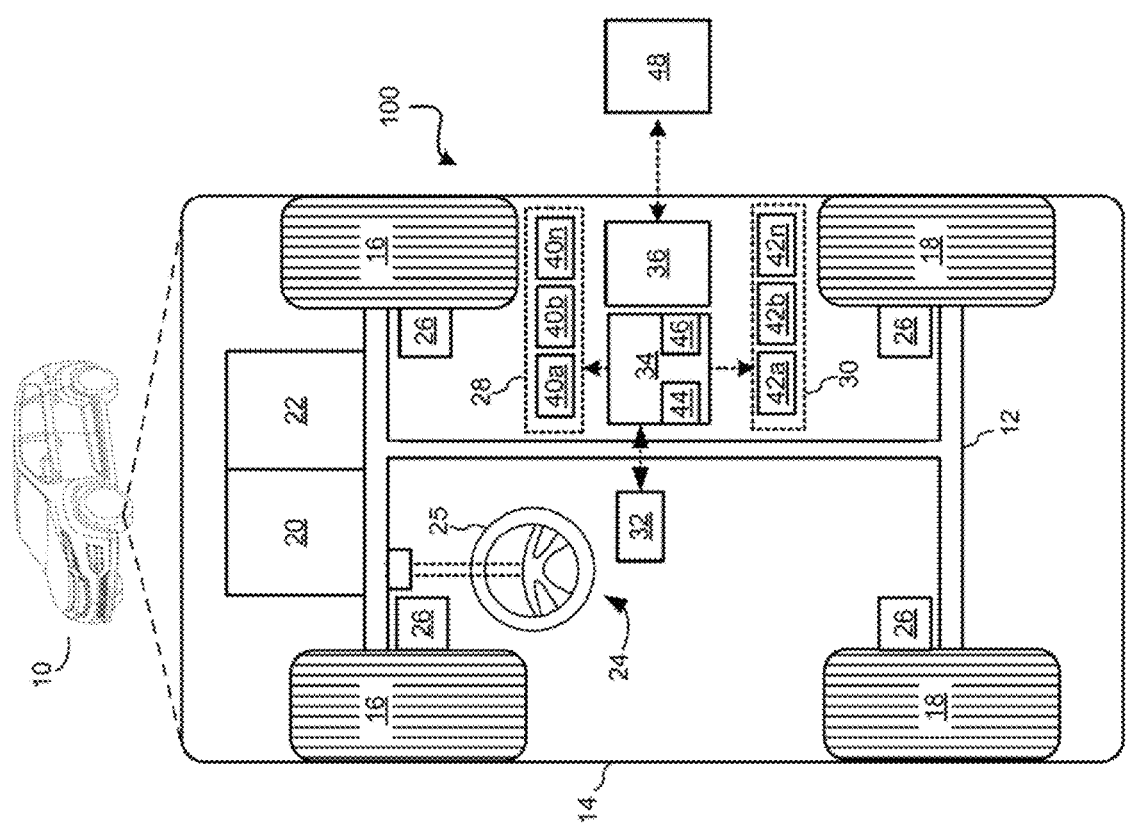
FIG. 1 is a functional block diagram illustrating an autonomous vehicle including an obstacle management system, in accordance with various embodiments.

With reference to FIG. 1, an obstacle management system shown generally as 100 is associated with a vehicle 10 in accordance with various embodiments. In general, obstacle management system (or simply "system") 100 allows for positioning vehicle 10 to reduce the occluding effect of an obstacle without significantly obstructing the traffic flow in a lane, then monitoring the lane and any oncoming traffic (e.g., via radar, lidar, etc.) to determine when an intended path is clear. Thus, system 100 implements what might be referred to herein as a "peek and clear" system that effectively "peeks" out behind view-obstructing obstacles and "clears" the way to complete the desired maneuver.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the obstacle management system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, controller 34 is configured to implement an obstacle management system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
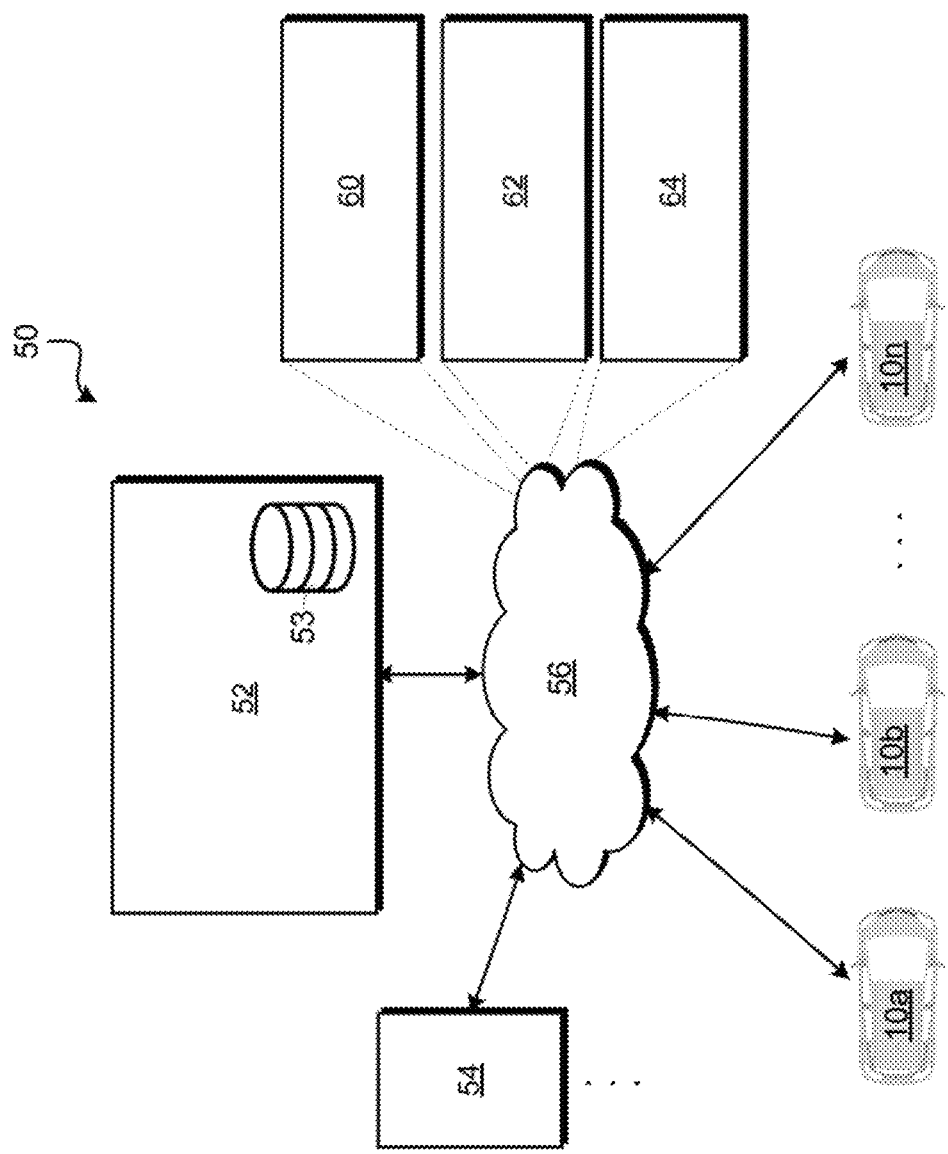
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous-vehicle-based remote transportation system. FIG. 2 illustrates an exemplary embodiment of an operating environment shown generally at 50 that includes an autonomous-vehicle-based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
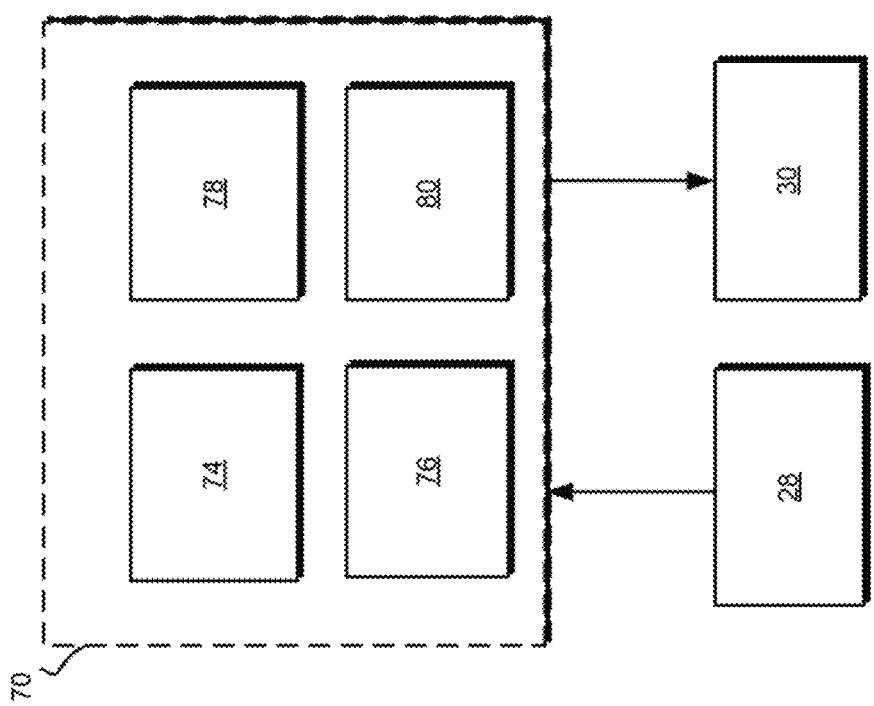
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes the acquired sensor data and predicts the presence, location, classification, and/or path of objects and features of the environment of the vehicle 10. In various embodiments, the computer vision system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 10 relative to the environment. As can be appreciated, a variety of techniques may be employed to accomplish this localization, including, for example, simultaneous localization and mapping (SLAM), particle filters, Kalman filters, Bayesian filters, and the like.

The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, all or parts of the obstacle management system 100 may be included within the computer vision system 74, the positioning system 76, the guidance system 78, and/or the vehicle control system 80. As mentioned briefly above, the obstacle management system 100 of FIG. 1 is configured to position AV 10 (perhaps iteratively) in such a way that reduces the occluding effect of an obstacle without significantly obstructing traffic flow, then monitors oncoming traffic (e.g., via radar, lidar, etc.) to determine when the intended path is clear to enter the flow of oncoming traffic, e.g., while attempting to turn right into traffic from a minor road or alley (a technique referred to herein as "peek and clear").

In that regard, FIGS. 4-6 present successive, top-down views of an example scenario useful in understanding the present subject matter. More particularly, FIG. 4 illustrates an AV 10 that is stopped or substantially stationary within a lane 420 at an intersection as shown. The intended path of AV 10 (path 602) requires entering the flow of oncoming traffic in lane 410, which includes vehicles 421 and 422, shown as moving to the right in FIG. 4. Stated another way, AV 10 is waiting for lane 410 to be sufficiently clear that it can turn right into traffic from a minor road (lane 420).

As will be apparent, vehicle 10 is positioned in such a way that an obstacle 408 (in this example, a large tree) blocks or occludes to some extent the field of view 502 of one or more sensing devices (such as side-facing radar sensor 590) of AV 10, thus reducing the ability for AV 10 to observe oncoming traffic within lane 410. For example, AV 10 may not be able to entirely track oncoming vehicles 421 and/or 422 via sensing device 590.

Referring now to FIGS. 5 and 6, an obstacle management system 100 in accordance with various embodiments is configured to position AV 10 in such a way that it reduces the occluding effect of obstacle 408 (with respect to one or more sensing devices) without significantly obstructing oncoming traffic in lane 410. Various methods of performing this movement will be described in detail below. In this regard, the phrase "without significantly obstructing" as used herein refers to a position and pose that would not prevent oncoming traffic from proceeding in lane 410 beyond AV 10. As used herein, the term "position" refers to the spatial location of AV 10 (e.g., in terms of GPS coordinates or the like), while the term "pose" refers to the orientation or "heading" of AV 10 using any convenient angular unit or directional indicators.

For example, as shown in FIG. 5, AV 10 has been positioned such that a front portion 561 of AV 10 extends slightly beyond a line 562 of the intersection, and its pose has been adjusted such that its longitudinal axis is non-parallel to lane 410 by a small angle as shown. As illustrated, this change in position and pose results in a more efficacious field of view 502, allowing any sensing device 590 or other similarly situated sensing devices to monitor lane 410, including the speed, position, and acceleration of oncoming vehicles such as vehicle 421 and/or 422. It will be appreciated that AV 10 as illustrated in FIG. 5 does not extend into lane 410 in such a way that vehicle 421—including a reasonable buffer space around vehicle 421—would be prevented from continuing past vehicle 421 in lane 410.

Once AV 10 is positioned as shown in FIG. 5, obstacle management system 100 can then monitor oncoming traffic and determine when lane 410 is sufficiently clear that AV 10 may enter the traffic flow along a path 602 as shown in FIG. 6 and continue along its originally intended path (i.e., a path that continues straight along lane 410). It will be appreciated that the particular angles and positions illustrated in FIGS. 4-6 are not intended to be limiting, and that the present subject matter may be adapted to address a wide range of obstacle, lane geometries, and intersections. For example, obstacle 408 might be another vehicle (e.g., a parked vehicle), a building or other permanent structure, a group of pedestrians, natural flora, signage, construction-related objects, or the like.

Figure 7:
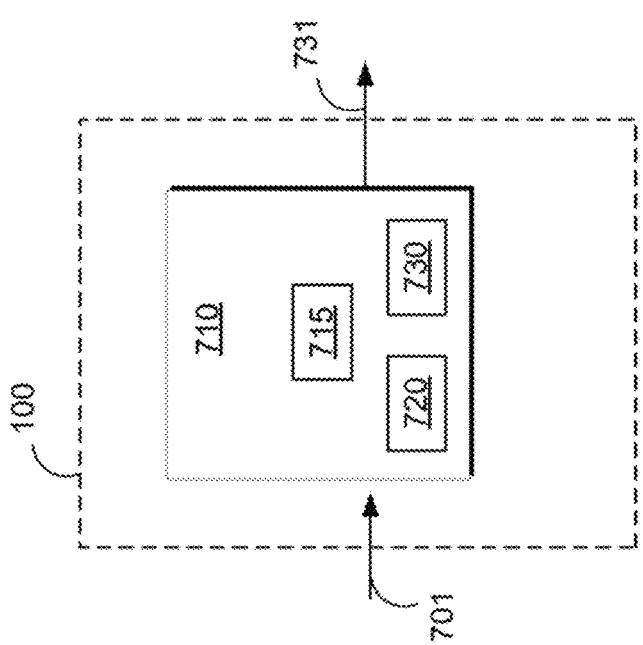
FIG. 7 is a dataflow diagram illustrating an obstacle management system of an autonomous vehicle, in accordance with various embodiments.

Referring now to FIG. 7, an exemplary obstacle management system 100 generally includes an obstacle management module (or simply "module") 710 that itself includes an obstacle detection submodule (or "module" 715), a positioning submodule (or "module") 720 and a clearing submodule (or "module") 730. In general, obstacle management module 710 receives sensor data 701 (e.g., optical camera data, radar sensor returns, lidar sensor returns, etc.) from which it can determine the presence of an obstacle (e.g., obstacle 408 in FIG. 4) occluding to some extent the view of a lane (e.g., lane 410 in FIG. 6) and, after it determines that the path is clear, produces an output 731 indicating that AV 10 may continue along its intended path and enter the flow of traffic (as shown in FIG. 6).

Obstacle detection module 715 is configured to determine that an obstacle (e.g., obstacle 408 of FIG. 4) is in fact an object that is likely to be stationary for a significant length of time—e.g., an amount of time that is greater than the length of time that AV 10 will need to confirm that the path is sufficiently clear that it can enter the flow of traffic. Non-limiting examples of such obstacles include trees, bushes, signage, building structures, pedestrians, cars, trucks, trash bins, and the like. Classification of obstacles may be accomplished using any suitable method, including various machine learning models trained to classify such obstacles based on sensor data 701. For example, obstacle management system 100 may implement a convolutional neural network (CNN) or other classifier trained to recognize a wide range of such obstacles. Note, however, that it is not necessary to classify the obstruction, as long as the presence of the obstacle has been determined in some way. In this regard, the obstruction may be determined as occlusions present to the sensors on the sensor level, not necessarily as part of an explicit object detection system as shown in the illustrated embodiment.

Positioning submodule 720 assists in adjusting the location and/or pose of AV 10 in such a way that the occluding effect of the obstacle is reduced or eliminated, without significantly obstructing the oncoming lane or lanes, as depicted in FIG. 5. Clearing submodule 730 is generally configured to monitor any oncoming traffic in the vicinity of AV 10 (e.g., in the oncoming lane 410) and determine whether AV 10 is clear to proceed, as shown in FIG. 6. Submodule 730 may determine whether it is clear to proceed using a variety of methods.

It will be understood that various embodiments of obstacle management system 100 according to the present disclosure may include any number of additional sub-modules embedded within the controller 34 which may be combined and/or further partitioned to similarly implement systems and methods described herein. Furthermore, inputs to the obstacle management system 100 may be received from the sensor system 28, received from other control modules (not shown) associated with the autonomous vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

The various modules described above may be implemented as one or more machine learning models that undergo supervised, unsupervised, semi-supervised, or reinforcement learning and perform classification (e.g., binary or multiclass classification), detection, regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

In some embodiments, training of any machine learning models used by system 100 occurs within a system remote from AV 10 (e.g., system 52 in FIG. 2) and is subsequently downloaded to vehicle 10 for use during normal operation of vehicle 10. In other embodiments, training occurs at least in part within controller 34 of vehicle 10, itself, and the model is subsequently shared with external systems and/or other vehicles in a fleet (such as depicted in FIG. 2). Training data may similarly be generated by vehicle 10 or acquired externally, and may be partitioned into training sets, validation sets, and test sets prior to training.

Figure 8:
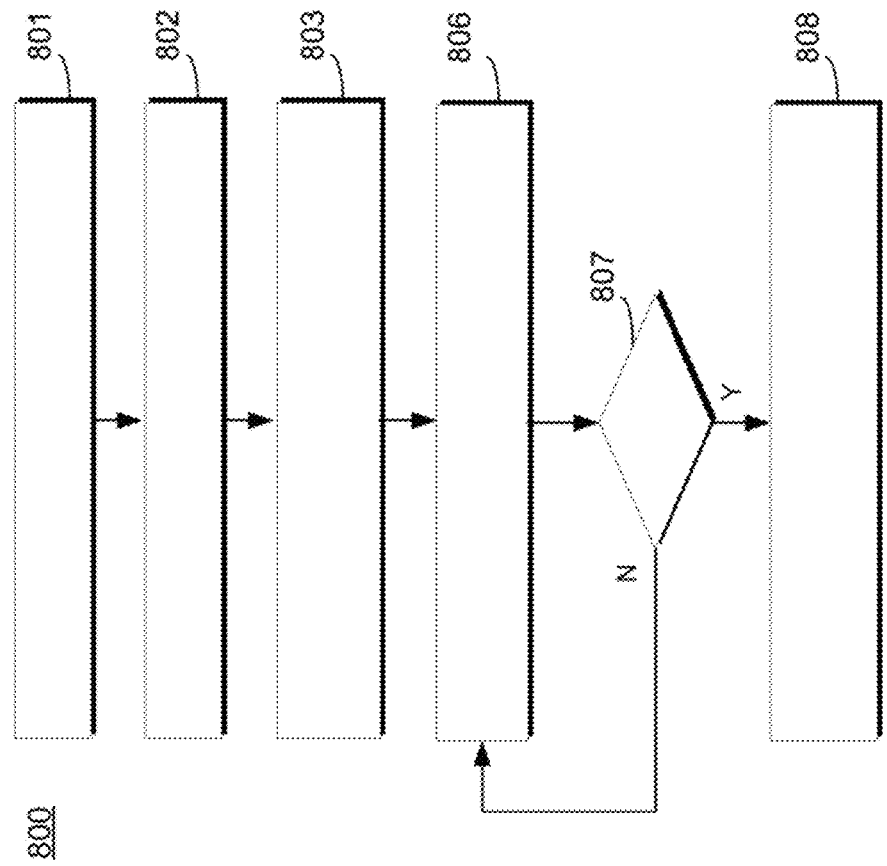
FIG. 8 is a flowchart illustrating a control method for controlling the autonomous vehicle, in accordance with various embodiments.

Referring now to FIG. 8, and with continued reference to FIGS. 1-7, the illustrated flowchart provides a control method 800 that can be performed by obstacle management system 100 in accordance with the present disclosure. As will be appreciated in light of the present disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of autonomous vehicle 10.

In various embodiments, the method begins at 801, in which sensor data relating to the environment associated with AV 10 is received. As detailed above, this sensor data might be received from a variety of sensing devices, such as optical cameras, lidar sensors, radar sensors, etc. At 802, this sensor data is then used to determine the presence of an obstacle (e.g., obstacle 408), as described above and illustrated by way of example in FIG. 4. In one embodiment, obstacle detection module 715 detects an object that at least partially occludes a view of the opposing lane (e.g., facing oncoming traffic) by at least one sensing device of sensor system 28 (as depicted in FIG. 4). As will be appreciated, depending upon the size and shape of obstacle 408, some sensing devices of sensor system 28 might have a full view of lane 410 (e.g., top-mounted cameras, lidar, etc.), while other sensing devices of sensor system 28 might have only a partial view of opposing lane 410 in a direction that faces oncoming traffic (e.g., side mounted radar sensor 590 of FIG. 4). The extent to which the obstacle blocks the view of AV 10 may be quantified as a confidence level—i.e., a confidence level associated with whether and to what extent system 100 can determine that the path is clear to enter the traffic flow. The task of system 100 can then be recast as an attempt to raise this confidence level (e.g., above some threshold value) by repositioning vehicle 10 to "peek around" obstacle 408. This confidence level may be predetermined (e.g., greater than or equal to a 96% confidence interval, or may adaptive based on one or more factors, such as the nature of the current location, weather factors, and the like).

As used herein, the term "clear" with respect to a path generally refers to the case in which system 100 has determined that AV 10 has a suitable view of the area of interest and can verify that it can observe all relevant objects, and thus may proceed along its intended path at a reasonable planned acceleration, velocity, and other kinematic attributes known in the art. This is performed with a sufficient spatial margin remaining between AV 10 and any vehicles and objects in the vicinity of AV 10, such as moving vehicles in the same and adjacent lanes, parked vehicles, pedestrians, geographical features, and the like (i.e., "relevant" objects). Such a determination may be made by one or more modules within ADS 70 of FIG. 3.

Accordingly, at 803, obstacle management module 710 positions (or determines the necessary position of) AV 10 to reduce the occluding effect of the obstacle (as shown in FIG. 5) without significantly obstructing the first lane. The position and/or pose of AV 10 after this procedure may, in various embodiments, diverge from what might be the nominal position and/or pose of AV if it were to be stopped at an intersection under normal conditions. Stated another way, AV 10 might move to a position where its front end projects beyond its usual stopping point for that intersection. FIG. 4, by way of contrast, illustrates what might be considered a nominal pose and position if obstacle 408 were not present.

The determination as to what constitutes "significantly obstructing a lane" might take into account, for example, lane width information from map data, the expected widths of any oncoming traffic, other objects in the vicinity that might affect the behavior of traffic, etc. In some embodiments, sensor data may be used to make this determination (e.g., by directly determining lane width).

The range of vehicle positions and poses employed to "peek" around objects may vary, depending upon the nature of the obstacle, the nature of AV 10, the type of sensors being used to monitor oncoming traffic, the geometry of relevant lanes, and other characteristics of the environment, roadway, and surrounding objects.

In some embodiment, the geometry (e.g., width, length, height) of the obstacle may be estimated to assist in determining the optimum "peeking" position for AV 10. In some embodiments, for example, a convolutional neural network is trained using a set of known obstacle types, such as trees, bushes, signage, pedestrians, cars, trucks, trash bins, and the like. Knowing the class of obstacle 408, obstacle management module 710 may then consult a database of such obstacle classes and known dimensions (stored locally or remotely) to estimate its geometry. In one embodiment, the clearing module 730 monitors the first lane via the first sensing device includes tracking only a lead vehicle of a plurality of oncoming vehicles within the first lane. That is, it might be assumed that only the lead vehicle needs to be tracked, since it is unlikely that (in some contexts) any vehicles behind the lead vehicle would pass the lead vehicle 421 (e.g., when the vehicles are moving along a single lane 410). In some embodiments, a fast, heuristic method is utilized for this task. For example, in one embodiment, the system constrains the area that needs to be cleared based on the first oncoming vehicle, which is simply a geometric operation. It will be understood that the phrase "first lane" is not intended to limit the present embodiments to the "clearing" of a single lane; the present system and methods may be used in the context of roadways with any number of lanes.

Figure 9:
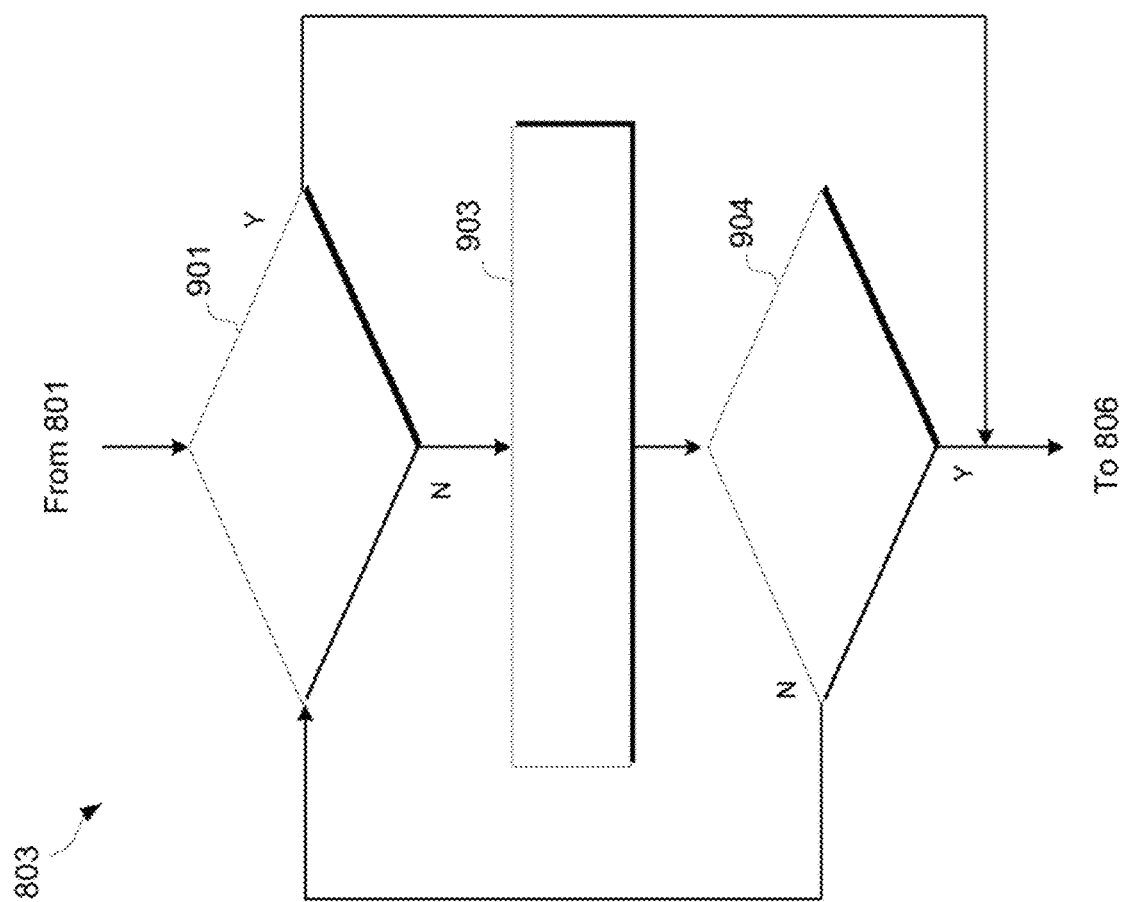
FIG. 9 is a flowchart illustrating an iterative control method, in accordance with various embodiments.

In some embodiments, positioning of AV 10 at 803 is performed iteratively. That is, positioning module 720 may instruct AV 10 to make a minor adjustment in position, determine whether its field of view is satisfactory, make another minor adjustment, and so on, until its position and pose are adequate using a predetermined confidence level and/or any other convenient criteria. Such an embodiment is illustrated in FIG. 9, in which step 803 of FIG. 8 is illustrated as an iterative process. That is, processing may begin at 901, in which system 100 queries whether further repositioning of AV 10 would significantly obstruct the lane in which oncoming traffic might be traveling, followed by repositioning AV 10 (at 903) by a predetermined amount (e.g., creeping forward, adjusting the pose, etc.) to improve the view of oncoming traffic. Next, at 904, it is determined whether the view of the oncoming traffic is optimum under the current conditions. That is, with respect to these conditions, it is determined whether system 100 has a reasonably high confidence that AV 10 may enter the flowing traffic given the geometry of the intersection, the geometry of the obstacle, the extent to which AV 10 has moved forward beyond a nominal position, and the like. If so, then processing continues to 805; if not, then processing returns to 901, as illustrated. It will be appreciated that such iterative movements closely mimic the behavior of human drivers, who tend to successively "creep" up and around obstacles to achieve a better view of oncoming traffic.

Referring again to FIG. 8, at 806 clearing module 730 monitors the opposing lane and oncoming traffic (e.g., lane 410 of FIG. 4) as well as any objects in the vicinity that might be relevant to completion of the intended maneuvering path. At 807, clearing module 730 determines whether the oncoming traffic is sufficiently clear that AV 10 may proceed and enter the flow of traffic. If so, then processing continues with 808, and AV 10 enters the flow of traffic along its originally intended path. If the path is not sufficiently clear, then processing returns to 806, whereupon clearing module 730 continues to monitor oncoming traffic. In some embodiments, the clearing module 730 further transmits information regarding the obstacle to a server remote from the vehicle (e.g., server 52). In this way, other vehicles (e.g., vehicles within a fleet of vehicles likely to encounter the same obstacle) may download information from the remote server in order to assist in recognizing the presence of such an obstacle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An obstacle management method comprising:
   determining, with a processor, an intended path of a vehicle, wherein the intended path includes an intersection;
   receiving, via one or more sensing devices, sensor data relating to an environment associated with the vehicle;
   determining, with a processor, the presence of an obstacle in the environment that at least partially occludes a view of the one or more sensing devices of a first lane of the intersection;
   determining, with a processor, at least one of a pose and a position of the vehicle with respect to the obstacle that does not significantly obstruct the first lane;
   controlling, with a processor, the vehicle based on the at least one of the pose and the position;
   monitoring, with a processor, the first lane via the first sensing device to determine when the intended path is clear; and
   controlling the vehicle to enter the traffic flow of the first lane when it is determined that the intended path is clear.

2. The method of claim 1, wherein the first sensing device is radar sensor.

3. The method of claim 1, wherein the at least one of the position and the pose of the vehicle is determined and the vehicle is controlled iteratively until the view of the first lane by the first sensing device has improved by a predetermined amount.

4. The method of claim 3, wherein the determining the at least one of the pose and the position comprises determining a position that moves the vehicle forward by a predetermined amount to improve the view of the first lane.

5. The method of claim 1, wherein the at least one of the pose and the position of the vehicle is such that a portion of the vehicle partially extends into the first lane of the intersection.

6. The method of claim 1, wherein the monitoring the first lane via the first sensing device includes tracking only a lead vehicle of a plurality of oncoming vehicles within the first lane.

7. The method of claim 1, further including transmitting information regarding the obstacle to a server remote from the vehicle.

8. A computer implemented system for controlling a vehicle, comprising:
   a non-transitory computer readable medium comprising:
   an obstacle detection module, configured to, by a processor:
      receive, via one or more sensing devices, sensor data relating to an environment associated with a vehicle;
      determine, from the sensor data, the presence of an obstacle that at least partially occludes a view of the one or more sensing devices of a first lane of an intersection of an intended path;
   a positioning module configured to, by a processor:
      determine, with a processor, at least one of a pose and a position of the vehicle with respect to the obstacle without significantly obstructing the first lane;
      control, with a processor, the vehicle based on the at least one of the pose and the position; and
   a clearing module configured to, by a processor:
      monitor the first lane via the first sensing device to determine when the intended path is clear; and
      control the vehicle to enter the traffic flow of the first lane when it is determined that the intended path is clear.

9. The system of claim 8, wherein the first sensing device is a radar sensor.

10. The system of claim 8, wherein the positioning module determines the at least one of pose and position and controls the vehicle iteratively until the view of the first lane by the first sensing device has improved by a predetermined amount.

11. The system of claim 10, the determining the at least one of the pose and the position comprises determining a position that moves the vehicle forward by a predetermined amount to improve the view of the first lane.

12. The system of claim 8, wherein the at least one of the pose and the position of the vehicle is such that a portion of the vehicle partially extends into the first lane of the intersection.

13. The system of claim 8, wherein the clearing module monitors the first lane via the first sensing device by tracking only a lead vehicle of a plurality of oncoming vehicles within the first lane.

14. The system of claim 8, wherein the clearing module further transmits information regarding the obstacle to a server remote from the vehicle.

15. An autonomous vehicle, comprising:
   a plurality of sensing devices that provide sensor data; and
   a controller that, by a processor and based on the sensor data:
      receives, via one or more sensing devices, sensor data relating to an environment associated with a vehicle, wherein the vehicle is substantially stationary and has an intended path corresponding to entering a traffic flow of a first lane;
      determines, with the sensor data, the presence of an obstacle that at least partially occludes a view of the one or more sensing devices of a first lane of the intersection;
      determines at least one of a pose and a position of the vehicle with respect to the obstacle that does not significantly obstruct the first lane;
      controls the vehicle based on the at least one of the pose and the position;
      monitors the first lane via the first sensing device to determine when the intended path is clear; and
      controls the autonomous vehicle to enter the traffic flow of the first lane when it is determined that the intended path is clear.

16. The autonomous vehicle of claim 15, wherein the first sensing device is radar sensor.

17. The autonomous vehicle of claim 15, wherein the controller determines the at least one of pose and position and controls the vehicle iteratively until the view of the first lane by the first sensing device has improved by a predetermined amount.

18. The autonomous vehicle of claim 15, wherein the controller alters the at least one of the pose and the position of the vehicle is such that a portion of the vehicle partially extends into the first lane of the intersection.

19. The autonomous vehicle of claim 15, wherein the controller monitors the first lane via the first sensing device includes by tracking only a lead vehicle of a plurality of oncoming vehicles within the first lane.

20. The autonomous vehicle of claim 15, wherein the clearing module further transmits information regarding the obstacle to a server remote from the vehicle.

* * * * *